A. F. LUTZ.
AUTOMOBILE JACK.
APPLICATION FILED JUNE 3, 1916.
1,223,814.
Patented Apr. 24, 1917.
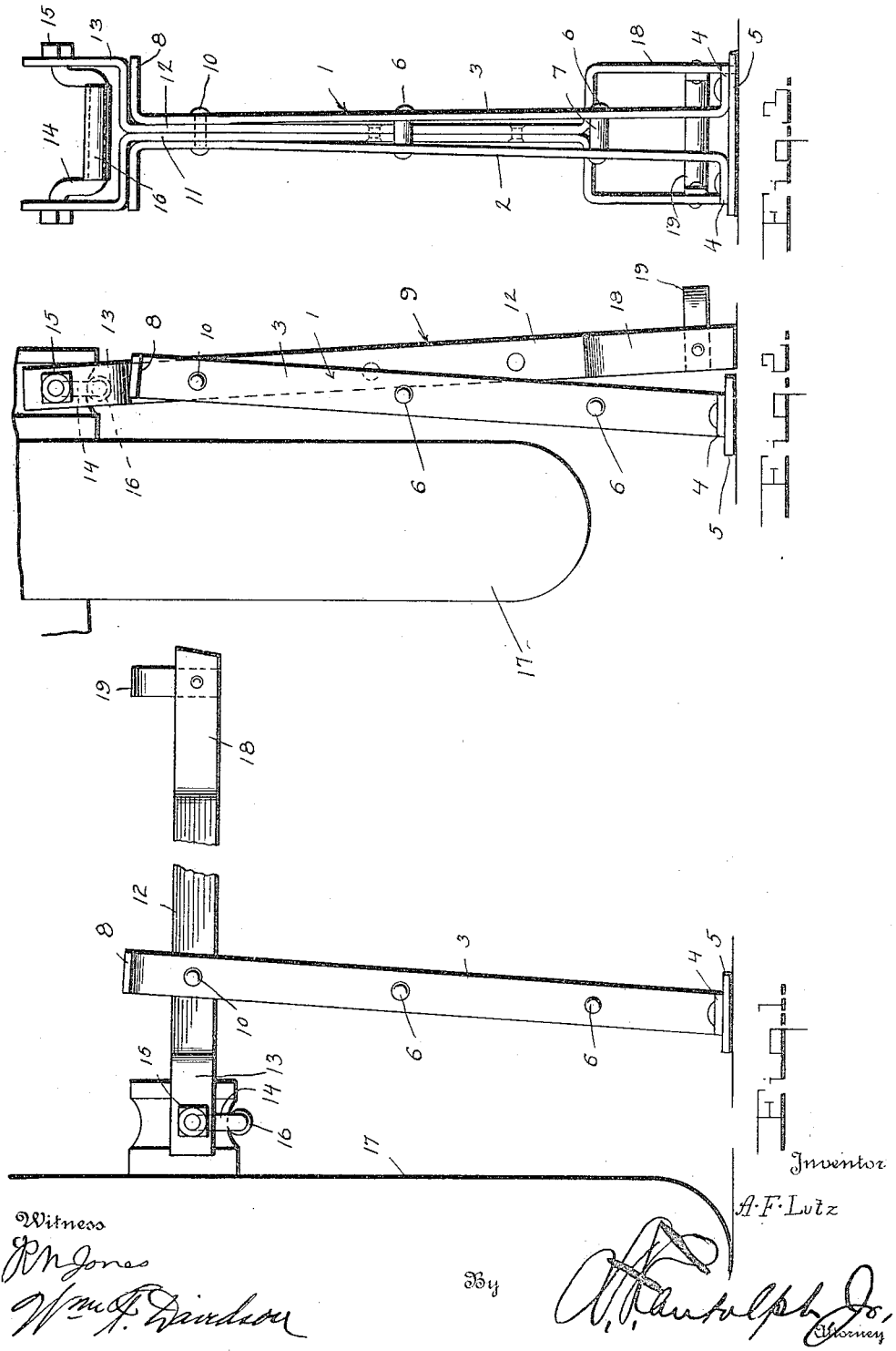
Witness
J. N. Jones
Wm. F. Davidson
Inventor
A. F. Lutz
By
A. Randolph Jr.
Attorney

UNITED STATES PATENT OFFICE.

AMBROSE F. LUTZ, OF KEOTA, IOWA.

AUTOMOBILE-JACK.

1,223,814.  Specification of Letters Patent.  Patented Apr. 24, 1917.

Application filed June 3, 1916. Serial No. 101,558.

*To all whom it may concern:*

Be it known that I, AMBROSE F. LUTZ, a citizen of the United States, residing at Keota, in the county of Keokuk and State of Iowa, have invented certain new and useful Improvements in Automobile-Jacks; and I do hereby declare the following to be a full, clear, and exact description of the invention, such as will enable others skilled in the art to which it appertains to make and use the same.

This invention relates to an automobile jack and one of its objects is the provision of a device of this character, which shall be simple, durable and efficient, and which may be manufactured and sold at a comparatively low cost.

Another object of this invention is to provide a standard mounted on a base, having a lever pivoted thereto and adjacent its upper end for an engagement with the hub of an automobile wheel for elevating the wheel when the lever is pushed downwardly.

A further object of this invention is to provide a forked end to the lever, having a hub engaging member pivoted thereto, for engaging the under side of the hub and which will retain said position when the wheel is elevated, to efficiently support same.

A further object of this invention is to provide bearing or supporting members formed on the upper end of the standard and adapted to be engaged by the forked end of the lever when said lever is pushed downwardly to elevate the wheel, thus positioning the forked end over the supporting or bearing members which aids in relieving the strain upon the pivot connection between the lever and standard.

A still further object of this invention is to provide the other end of the lever forked and of such a length that it will engage the ground when the lever is pushed downwardly to its fullest extent for elevating the wheel, whereby the lever will aid in supporting the wheel and which will act as a brake to the standard to prevent same from falling under the weight of the automobile.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a side elevation of an automobile jack, constructed in accordance with my invention, Fig. 2 is a similar view, illustrating the lever in a substantially vertical position for elevating an automobile wheel, and Fig. 3 is a front elevation of the device, illustrating the construction of the standard.

Referring in detail to the drawing, the numeral 1 indicates as an entirety, a standard consisting of members 2 and 3 which are provided with their lower ends bent at right angles to form feet 4, that are bolted or otherwise secured to a base 5. The members 2 and 3 diverge in the direction of each other from their lower ends toward their upper ends and are connected together by means of bolts or rivets 6 which have spacing blocks 7 mounted thereon for properly spacing the members 2 and 3 of the standard apart. The upper ends of the members 2 and 3 are bent at right angles to form bearings or supporting members 8.

A lever 9 is pivoted between and to the members 2 and 3 adjacent their upper ends by means of a bolt 10. The lever 9 consists of members 11 and 12 which are riveted or otherwise secured together. The members 11 and 12 of the lever 9 are bent at right angles and parallel with each other to provide a substantially U-shaped fork 13 at one end of the lever 9. The parallel arm portions of the U-shaped forked end of the lever 9 are apertured to receive the ends of a substantially U-shaped hub engaging member 14, having nuts 15 upon the ends thereof for retaining the hub engaging member to the fork 13. A suitable roller 16 surrounds the web portion of the substantially U-shaped hub engaging member 14 and is constructed from leather or other suitable material to prevent injuring the hub of a wheel 17 when engaged thereby. The members 11 and 12 of the lever 9 are provided with their opposite ends bent at right angles and parallel with each other to form supporting feet 18 which have pivotally secured thereto a substantially U-shaped handle 19 for raising and lowering the lever 9.

In operation, the standard 1 is placed adjacent the hub of the wheel 17 and the lever 9 is swung to a horizontal position as clearly illustrated in Fig. 1, allowing the hub engaging member 14 to engage the under side of the hub. By pushing downwardly upon the lever 9, the wheel 17 will be elevated and the forked end 13 of the lever will ride over the bearing or supporting members 8 of the standard. The forked end 13 overlying the bearing or supporting members 8 rests thereon and aids in relieving the strain upon the pivot bolt 10 between the lever 9 and the standard 1 when the wheel is in an elevated position. As the wheel is elevated, the hub engaging member 14 rotates within the parallel arms of the forked end of the lever so as to remain in an engagement with the under side of the hub of a wheel when said wheel is in an elevated position. When the lever 9 is pushed downwardly, the feet 18 engage the ground adjacent the base 5 of the standard 1 and aid in supporting the wheel in an elevated position, thus relieving the strain upon the pivot bolt 10 between the lever 9 and the standard 1. When the lever 9 is in this position, it also aids in supporting the standard 1 to prevent same from falling under the weight of the wheel 17.

While I have shown and described the preferred embodiment of my invention, it will be understood that minor changes in construction, combination and arrangement of parts may be made without departing from the spirit and scope of the invention as claimed.

Having thus described my invention, what I claim is:—

A jack comprising a pair of vertically extending and relatively spaced members, bolts extending through said members, spacing blocks carried by said bolts and disposed between the members, said members having their lower ends bent at right angles to form attaching feet, a base plate secured to the attaching feet, said members having their upper ends bent at right angles and disposed in opposite directions, a lever consisting of a pair of members secured together and pivoted between the members adjacent their upper ends, the members of the levers having one of their ends bent to form a substantially U-shaped handle, the ends of which are adapted to engage the ground when the lever is in a substantially vertical position to support the vertical standard, the other ends of the members of said lever being bent to form a substantially U-shaped member, the web portion of which is adapted to frictionally engage the right angled upper ends of the first named members when the lever is in a substantially vertical position to prevent the lever from accidentally moving upon its pivot with relation to the vertical members; and a substantially U-shaped member pivoted to the arm portions of the last named U-shaped end of the lever and adapted to engage the hub of a wheel.

In testimony whereof I affix my signature in presence of two witnesses.

AMBROSE F. LUTZ.

Witnesses:
M. E. HOSKINS,
H. GALE WILLIAMS.